United States Patent Office 3,222,201
Patented Dec. 7, 1965

3,222,201
CLEANING AND COATING FORMULATION
Francis K. Boyle, Tonawanda, Salem T. Clark, Grand Island, and Charles F. Swain, Niagara Falls, N.Y., assignors to Union Carbide Corporation, a corporation of New York
No Drawing. Filed Dec. 28, 1962, Ser. No. 247,832
6 Claims. (Cl. 106—285)

This invention relates to cleaning and coating formulations. More particularly, this invention relates to oil-in-water emulsions suitable for simultaneous cleaning and coating of finished surfaces.

Previous attempts in the art to provide such formulations have met with limited success. Chief drawbacks of the prior art formulations have been marginal effectiveness as a cleaner or a polish, instability of the emulsified ingredients upon storage, need of buffing after application, and the like. Polish compositions also require the presence of an abrasive which may damage surface finish. In addition, the prior art formulations do not lend themselves to use in automatic automobile washing operations.

In the latter application a formulation having a rapid and effective cleaning action is required. Moreover, it is necessary that the formulation is adapted to be easily rinsed off from the treated surface after cleaning and coating. To this end the formulation must possess what is referred to in the art as a fast water "break." This property manifests itself as a beading of water droplets on the treated surface during and after rinsing. Upon drying the water droplets can be removed by the relatively simple expedient of blowing air over the treated surface.

An object of the present invention is to obviate the difficulties and drawbacks of the prior art formulations and to provide an effective cleaning and coating formulation that requires minimum physical effort for application.

Another object is to provide a cleaning and coating formulation particularly well suited for use in automatic automobile washing establishments.

Still another object is to provide a formulation which promotes rapid beading of water on the cleaned and coated surface.

A further object is to provide a formulation having superior stability upon storage.

Still further objects will readily present themselves to one skilled in the art upon reference to the ensuing specification and claims.

These objects are achieved by an oil-in-water emulsion containing effective amounts of an organic cationic surfactant, an organic non-ionic surfactant, an emulsifiable mineral oil, a foam stabilizer, and water. Optionally the above formulation can also contain a sequestering agent and acetic acid.

The primary ingredients of these novel formulations are a non-ionic surfactant and a cationic surfactant. The non-ionic surfactant promotes cleaning, provides a strong sudsing action, and permits an easy rinse-off of a cleaned surface. The cationic emulsifier promotes the emulsification of the mineral oil contained in the formulation and along with said oil substantively plates out on the cleaned surface, thereby providing a water-repellent, protective coating on the cleaned surface.

In order to promote foaming of the cleaning and coating formulation, a foam stabilizer is incorporated therein. Foam is desirable as an indicator of cleaned areas during washing, thereby obviating unnecessary movements and also to aid in the carrying-off of dirt during subsequent rinsing.

A sequestering agent can be employed in hard-water areas for calcium, magnesium, and other metal ions usually found in hard water.

Acetic acid functions in the formulations as a product stabilizer assuring an acceptable oil-in-water emulsion at all times. It also serves as an effective modifier of the viscosity of the formulations and sometimes promotes the solubility in water of the cationic surfactants employed in a given instance.

The broad group of compounds known in the art as surfactants is further classified in three distinct categories—cationic surfactants, non-ionic surfactants, and anionic surfactants. The non-ionic surfactants do not ionize in water and are long molecules which on one end are hydrophilic and lipophobic and on the other end hydrophobic and lipophilic. The cationic surfactants and the anionic surfactants ionize in water to provide charged ions of long molecular structure. In cationic surfactants the lipophilic hydrophobic end is on the positively charged cation and in anionic surfactants the lipophilic hydrophobic end is on the negatively charged anion.

Specifically contemplated cationic surfactants are nitrogen-containing compounds which are the reaction products of long-chain fatty acids containing from 8 to 22 carbon atoms with alkylene polyamines, alkylol amines or ammonia, the condensation products of a primary fatty amine containing from 8 to 22 carbon atoms with an alkylene oxide, such as ethylene oxide or other active epoxides such as propylene oxide and the like, and the quaternary ammonium salts of fatty amines having at least one alkyl substituent containing from 8 to 22 carbon atoms such as fatty amine acetates, fatty amine chlorides, fatty amine bromides, and the like.

Typical illustrative nitrogen-containing compounds which are the reaction products of long-chain fatty acids containing from 8 to 22 carbon atoms with alkylene polyamines are 1-(2-aminoethyl)-2-heptadecenyl-2-imidazoline, 1-(2-aminoethyl)-2-heptadecadienyl-2-imidazoline, and the like.

Typical reaction products of long-chain fatty acids containing from 8 to 22 carbon atoms with alkylol amines are 1-(2-hydroxyethyl)-2-heptadecenyl-2-imidazolie, 1-(2-hydroxyethyl)-2-heptadecadienyl-2-imidazoline, and the like.

Typical reaction products of long-chain fatty acids containing from 8 to 22 carbon atoms with ammonia are octadecylamide, hexadecylamide, docosylamide, octylamide, and the like.

Typical condensation products of a primary fatty amine with an alkylene oxide or the like are the N,N-di(mono- and polyalkyleneoxyalkylol)-octadecylamines, the N,N-di(mono- and polyalkyleneoxyalkylol)-heptadecylamines, the N,N-di(mono- and polyalkyleneoxyalkylol)-hexadecylamines, the N,N-di(mono- and polyalkyleneoxyalkylol)-tetradecylamines, the N,N-di(mono- and polyalkyleneoxyalkylol)-dodecylamines, and the like.

Typical quaternary ammonium salts are the coconut oil quaternary amine acetates, octadecyltrimethylammonium chloride, octadecylbenzyldimethylammonium chloride, hexadecyldimethylethylammonium bromide, dodecyltrimethylammonium bromide, dodecyltrimethylammonium chloride, and the like.

Preferred cationic surfactants for the instant formulations are mixtures of nitrogen-containing compounds which are the reaction products of fatty acids containing from 8 to 22 carbon atoms with ethylene polyamines and condensation products of a primary fatty amine with ethylene oxide wherein the mole ratio of ethylene oxide to fatty amine is from about 4 to about 7.

Particularly preferred cationic surfactant is a mixture of 1-(2-aminoethyl)-2-heptadecenyl-2-imidazoline, 1-(2- aminoethyl)-2-heptadecadienyl-2-imidazoline, and condensation products of tallow amines with ethylene oxide in a mole ratio of ethylene oxide to tallow amines of about 5.

By the term "non-ionic surfactant" as used herein and in the appended claims is meant an organic compound of a relatively high molecular weight and which consists of a hydrophobic portion to which is attached a solubilizing or hydrophilic portion containing groups such as ether links (—C—O—C—), hydroxyl groups (—OH), carbonyloxy groups

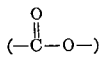

and the like. With very few exceptions the non-ionic surfactants contain at least one hydroxyl group.

Specifically contemplated within the above definition are surfactants having as the hydrophilic moiety one or more chains containing one or more alkyleneoxy groups. These surfactants have the general formula

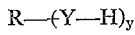

wherein R is the hydrophobic portion of an aliphatic alcohol containing from about 8 to about 22 carbon atoms or an alkylated phenol containing from about 4 to about 22 carbon atoms in the alkyl group thereof, Y is an alkyleneoxy chain, H is a hydrogen atom bonded to an oxygen atom of the alkyleneoxy chain, and y is an integer from 1 to about 6, and preferably from 1 to 4.

Typical aliphatic alcohols are octyl alcohol, nonyl alcohol, decyl alcohol, "coco" alcohol (a mixture of $C_{10}$ to $C_{16}$ alcohols), dodecyl alcohol, oleyl alcohol, tallow alcohol (a mixture of $C_{16}$ to $C_{18}$ alcohols), octadecyl alcohol, 2,6,8-trimethyl-4-nonyl alcohol, and the like.

Typical alkylated phenols are butylphenol, penylphenol, hexylphenol, octyphenol, nonylphenol, dodecylphenol, hexadecylphenol, octadecylphenol, nonadecylphenol, and the like.

By the term "alkyleneoxy chain" as used herein and in the appended claims is meant a chain containing one or more alkyleneoxy groups which are divalent alkylene groups such as methylene, ethylene, propylene, butylene, and the like, bonded to an oxygen atom in a manner such that one of the valences of the alkyleneoxy group is from an oxygen atom and the other is from a carbon atom. Typical alkyleneoxy groups are methyleneoxy (—CH$_2$O—), ethyleneoxy (—C$_2$H$_4$O—), propyleneoxy (—C$_3$H$_6$O—), butyleneoxy (—C$_4$H$_8$O—), and the like.

Preferred non-ionic surfactants for the instant formulations are the polyalkylene glycol ethers containing from about 4 to about 80 moles of alkylene oxide. Illustrative preferred non-ionic surfactants are the nonylphenyl polyethylene glycol ethers containing about 4 moles of ethylene oxide, the trimethylnonyl polyethylene glycol ethers containing about 6 moles ethylene oxide, the nonylphenyl polyethylene glycol ethers containing about 7 moles of ethylene oxide, mixed polyalkylene glycol ethers containing about 60 moles of a mixture of ethylene oxide and 1,2-propylene oxide in a mole ratio of about 2:1, and the like.

Emulsifiable mineral oils suitable for the formulations of the present invention are the paraffinic and the naphthenic mineral oils having a viscosity in the range from about 20 to about 200 Saybolt Universal seconds (SUS) at 100° F. A viscosity below about 20 SUS results in a less durable coating on the treated surface, and viscosity above about 200 SUS promotes smear and emulsion instability. Paraffin oils within the aforesaid viscosity range and particularly in the range from about 70 to about 100 SUS at 100° F. are preferred in the instant formulations.

Foam stabilizers suitable for use in the present invention are the fatty acid alkylolamides of the general type

R'CONHR"OH wherein R' is an aliphatic hydrocarbon radical containing from 8 to 22 carbon atoms such as octyl, nonyl, decyl, dodecyl, tetradecyl, hexadecyl, octadecyl, nonenyl, docosyl, and the like, and wherein R" is an alkylene radical containing from 1 to 8 carbon atoms such as methylene, ethylene, the propylenes, the butylenes, the pentylenes, the hexylenes, the heptylenes, and the octylenes.

Preferred foam stabilizers are the lauric acid alkylolamides, i.e., undecyl methanolamide, undecylethanolamide, the undecylpropanolamides, the undecylbutanolamides, and the like.

Suitable sequestering agents that can be optionally used in the present formulations are the water-soluble salts of aminocarboxylic acids and mixtures thereof. Typical of such agents are tetrasodium ethylene diamine tetraacetate, tetrasodium ethylene diamine tetrapropionate, tetrapotassium propylene diamine tetraacetate, tetrasodium ethylene diamine tetrabutyrate, trisodium nitrilotriacetate, and the like. The preferred sequestering agent is tetrasodium ethylene diamine tetraacetate.

In the concentrated cleaning and coating formulations the cationic surfactant is present usually in an amount in the range from about 1 to about 15 percent by weight of the concentrate. Preferably the cationic surfactant is present in an amount in the range from about 2.5 to about 9 percent by weight.

The non-ionic surfactant is present in these formulations usually in an amount in the range from about 4 to about 20 percent by weight. The preferred range for the non-ionic surfactant is from about 8.5 to about 15 percent by weight.

The emulsifiable mineral oil is present in the concentrated cleaning and polishing formulations usually in an amount in the range from about 2 to about 12 percent by weight of the formulation, and preferably in an amount from about 4 to about 9 percent by weight. Oil in amounts in excess of about 12 percent by weight tends to decrease the stability of the emulsion.

The foam stabilizer is added in amounts ranging from about 1 to about 5 percent by weight of formulation. The preferred amount of foam stabilizer present in the concentrated formulation is from about 2.5 to about 3 percent by weight.

Sequestering agents can be added to a concentrated cleaning and coating formulation in amounts ranging from about .1 to about .4 percent by weight, and preferably from about .2 to about .3 percent by weight.

Acetic acid can be added to a concentrated cleaning and coating formulation in amounts in the range of up to about 2 percent by weight, and preferably up to about .9 percent by weight.

The remainder of the formulation is water added in an amount sufficient to maintain the concentrations of the aforedescribed constituents within the specified ranges.

The concentrated cleaning and coating formulation is prepared by blending together at about room temperature a non-ionic surfactant, a cationic surfactant, a foam stabilizer, and a mineral oil.

Another blend is prepared from a sequestering agent, acetic acid, and water.

These two resulting blends are then admixed with agitation to form the final concentrated product. Preferably, the water-phase is added to the oil phase during the admixing operation so as to achieve emulsion inversion during blending. In use the concentrated cleaning and coating formulation is extended with additional amounts of water in a ratio up to about 400 parts of water to 1 part of the concentrate. The diluted formulation is then applied to the surface to be cleaned as a spray, with a rag, sponge, brush or the like. A minimum of physical effort is required for the operation. Thereafter, the surface is rinsed with clean water and dried. The effectiveness of the instant formulations is manifested during the rinsing step by a visible "break" of the water film. Water collects on the cleaned surface only in beads and can be readily blown off or wiped off. Surfaces cleaned and polished in the aforedescribed manner have retained water repellency up to ten weeks after cleaning.

It has been found that particularly effective cleaning and coating formulations can be obtained if a mixture of cationic surfactants and a mixture of non-ionic surfactants is employed. Typical such formulations will be illustrated below.

Formulation No. 1

| Component: | Weight percent |
|---|---|
| Cationic surfactant—1 - (2 - hydroxyethyl)-2-heptadecenyl-2-imidazoline | 2.5 |
| Non-ionic surfactant— | |
| Nonylphenyl polyethylene glycol ether containing 4 moles of ethylene oxide | 1.5 |
| Nonylphenyl polyethylene glycol ether containing 7 moles of ethylene oxide | 7.0 |
| | 8.5 |
| Paraffin oil, 86 SUS @ 100° F. | 8.0 |
| Lauric acid alkylolamide | 2.5 |
| Water | 78.5 |
| | 100.0 |

Formulation No. 2

| Component: | Weight percent |
|---|---|
| Cationic surfactant— | |
| A mixture of 1-(2-aminoethyl)-2-heptadenyl-2-imidazoline and 1-(2-aminoethyl)-2-heptadecadienyl-2-imidazoline | 3.3 |
| Ethylene oxidecondensation products of primary fatty amines | 1.65 |
| | 4.95 |
| Non-ionic surfactant— | |
| Nonylphenyl polyethylene glycol ether containing 7 moles of ethylene oxide | 4.95 |
| Trimethylnonyl polyethylene glycol ether containing 6 moles of ethylene oxide | 1.10 |
| A mixed polyalkylene glycol ether containing about 60 moles of a mixture of ethylene oxide and 1,2-propylene oxide in a mole ratio of about 2:1 | 6.00 |
| | 12.05 |
| Paraffin oil, 86 SUS @ 100° F | 4.00 |
| Lauric acid alkylolamide | 3.00 |
| Tetrasodium ethylene diamine tetraacetate | 0.20 |
| Acetic acid | 0.90 |
| Water | 74.90 |
| | 100.00 |

NOTE.—This formulation was found to be particularly well suited for manual cleaning and polishing of automobiles.

Formulation No. 3

| Component: | Weight percent |
|---|---|
| Cationic surfactant— | |
| A mixture of 1-(2-aminoethyl)-2-heptadecenyl-2-imidazoline and 1-(2-aminoethyl)-2-heptadecadienyl-2-imidazoline | 6.0 |
| Ethylene oxide condensation products of primary fatty amines | 3.0 |
| | 9.0 |
| Non-ionic surfactant— | |
| Nonylphenyl polyethylene glycol ether containing 7 moles of ethylene oxide | 9.0 |
| Trimethylnonyl polyethylene glycolether containing 6 moles of ethylene oxide | 2.0 |
| A mixed polyalkylene glycol ether containing about 60 moles of a mixture of ethylene oxide and 1,2-propylene oxide in a mole ratio of about 2:1 | 4.0 |
| | 15.0 |
| Paraffin oil, 86 SUS @ 100° F | 9.0 |
| Lauric acid alkylolamide | 3.0 |
| Tetrasodium ethylene diamine tetraacetate | 0.3 |
| Water | 63.7 |
| | 100.0 |

NOTE.—This formulation was found to be particularly well suited for power driven automobile washes.

Formulation No. 4

| Component: | Weight percent |
|---|---|
| Cationic surfactant—1-(2-hydroxyethyl)-2-heptadecenyl-2-imidazoline | 2.5 |
| Non-ionic surfactant— | |
| Nonylphenyl polyethylene glycol ether containing 4 moles of ethylene oxide | 1.5 |
| Nonylphenyl polyethylene glycol ether containing 7 moles of ethylene oxide | 7.0 |
| | 8.5 |
| Paraffin oil, 86 SUS @ 100° F | 4.0 |
| Lauric acid alkylolamide | 2.5 |
| Acetic acid | 0.6 |
| Water | 81.9 |
| | 100.0 |

The foregoing discussion and exemplary formulations are intended as illustrative of the present invention. Other modifications within the spirit and scope of this invention will readily present themselves to one skilled in the art.

We claim:

1. A cleaning and coating concentrate which is an oil-in-water emulsion consisting essentially of about 2.5 to about 9 percent by weight of an organic cationic surfactant which is selected from the group consisting of a recation product of a long-chain fatty acid containing from 8 to 22 carbon atoms with an alkylene polyamine, a reaction product of a long-chain fatty acid containing from 8 to 22 carbon atoms with an alkylol amine, a reaction product of a long-chain fatty acid containing from 8 to 22 carbon atoms with ammonia, a condensation product of a primary fatty amine containing from 8 to 22 carbon atoms with an alkylene oxide, and a quaternary ammonium salt of a fatty amine having at least one substituent containing from 8 to 22 carbon atoms; about 8.5 to about 15 percent by weight of an organic non-ionic surfactant represented by the formula:

$$R—(Y—H)_y$$

wherein R is the hydrophobic portion of a hydrophobic organic compound which is a member of the group consisting of an aliphatic alcohol containing from about 8 to about 22 carbon atoms and an alkylated phenol containing from about 4 to about 22 carbon atoms in the alkyl group thereof, Y is an alkyleneoxy chain, H is a hydrogen atom bonded to an oxygen atom of said alkyleneoxy chain, and y is an integer from 1 to about 6; about 4 to about 9 percent by weight of an emulsifiable mineral oil selected from the group consisting of a paraffin oil and a naphthene oil and having a viscosity in the range from about 20 to about 200 SUS at 100° F.; about 2.5 to about 3 percent by weight of a fatty acid alklolamide represented by the formula $$R'CONHR''OH$$

wherein R' is an aliphatic hydrocarbon radical containing from 8 to 22 carbon atoms, and R'' is an alkylene radical containing from 1 to 8 carbon atoms; about .2 to about .3 percent by weight of a water-soluble salt of an aminocarboxylic acid; up to about .9 percent by weight acetic acid; and the remainder water.

2. A cleaning and coating concentrate which is an oil-in-water emulsion consisting essentially of about 2.5 to about 9 percent by weight of a mixture of a reaction product of a fatty acid containing from 8 to 22 carbon atoms with an ethylene polyamine and a condensation product of a primary fatty amine containing from 8 to 22 carbon atoms with ethylene oxide; about 8.5 to about 15 percent by weight of a mixture of polyalkylene glycol ethers containing from about 4 to about 80 moles of an alkylene oxide; about 4 to about 9 percent by weight of an emulsifiable paraffin oil having a viscosity in the range from about 70 to about 100 SUS at 100° F.; about 2.5 to about 3 percent by weight of a lauric acid alkylolamide; about .2 to about .3 percent by weight tetrasodium ethylene diamine tetra-acetate; up to about .9 percent by weight acetic acid, and the remainder water.

3. A cleaning and coating concentrate which is an oil-in-water emulsion consisting essentially of about 2.5 to about 9 percent by weight of a mixture of 1-(2-aminoethyl)-2-heptadecenyl - 2 - imidazoline, 1-(2-aminoethyl)-2-heptadecadienyl-2-imidazoline and condensation products of tallow amines with ethylene oxide in a mole ratio of ethylene oxide to tallow amines of about 5; about 8.5 to about 15 percent by weight of a mixture of polyethylene glycol ethers containing from about 4 to about 80 moles of ethylene oxide; about 4 to about 9 percent by weight of an emulsifiable paraffin oil having a viscosity in the range from about 70 to about 100 SUS at 100° F.; about 2.5 to about 3 percent by weight of a lauric acid alkylolamide; about .2 to about .3 percent by weight tetrasodium ethylene diamine tetra-acetate; and the remainder water.

4. A cleaning and coating concentrate which is an oil-in-water emulsion consisting essentially of about 3.3 percent by weight of a mixture of 1-(2-aminoethyl)-2-heptadecenyl-2-imidazoline and 1-(2-aminoethyl)-2-heptadecadienyl-2-imidazoline, about 1.65 percent by weight of a condensation product of a primary fatty amine with ethylene oxide, about 4.95 percent by weight nonylphenyl polyethylene glycol ether containing about 7 moles of ethylene oxide, about 1.1 percent by weight trimethylnonyl polyethylene glycol ether containing about 6 moles of ethylene oxide, about 6.0 perecnt by weight of a mixed polyalkylene glycol ether containing about 60 moles of a mixture of ethylene oxide and 1,2-propylene oxide in a mole ratio of about 2:1, about 4.0 percent by weight paraffin oil having a viscosity of about 86 SUS at 100° F., about 3.0 percent by weight lauric acid alkylolamide, about 0.2 percent by weight tetrasodium ethylene diamine tetra-acetate, about 0.9 percent by weight acetic acid, and the remainder water.

5. A cleaning and coating concentrate which is an oil-in-water emulsion consisting essentially of about 6 percent by weight of a mixture of 1-(2-aminoethyl)-2-heptadecenyl-2-imidazoline and 1-(2-aminoethyl)-2-heptadecadienyl-2-imidazoline, about 3 percent by weight of a condensation product of a primary fatty amine with ethylene oxide, about 9 percent by weight nonylphenyl polyethylene glycol ether containing about 7 moles of ethylene oxide, about 2 percent by weight of trimethylnonyl polyethylene glycol ether containing about 6 moles of ethylene oxide about 4 percent by weight of a mixed polyalkylene glycol ether, containing about 60 moles of a mixture of ethylene oxide and 1,2-propylene oxide in a mole ratio of about 2:1, about 9 percent by weight paraffin oil having a viscosity of about 86 SUS at 100° F., about 3 percent by weight of a lauric acid alkylolamide, about 0.3 percent by weight tetrasodium ethylene diamine tetra-acetate, and the remainder water.

6. A cleaning and coating concentrate which is an oil-in-water emulsion consisting essentially of about 1 to about 15 percent by weight of an organic cationic surfactant which is selected from the group consisting of a reaction product of a long-chain fatty acid containing from 8 to 22 carbon atoms with an alkylene polyamine, a reaction product of a long-chain fatty acid containing from 8 to 22 carbon atoms with an alkylol amine, a reaction product of a long-chain fatty acid containing from 8 to 22 carbon atoms with ammonia, a condensation product of a primary fatty amine containing from 8 to 22 carbon atoms with an alkylene oxide, and a quaternary ammonium salt of a fatty amine having at least one substituent containing from 8 to 22 carbon atoms; about 2 to about 12 percent by weight of an organic nonionic surfactant represented by the formula:

$$R\text{---}(Y\text{---}H)_y$$

wherein R is the hydrophobic portion of a hydrophobic organic compound which is a member of the group consisting of an aliphatic alcohol containing from about 8 to about 22 carbon atoms and an alkylated phenol containing from about 4 to about 22 carbon atoms in the alkyl group thereof, Y is an alkenyleneoxy chain, H is a hydrogen atom bonded to an oxygen atom of said alkyleneoxy chain, and $y$ is an integer from 1 to about 6; about 2 to about 12 percent by weight of an emulsifiable mineral oil selected from the group consisting of a paraffin oil and a naphthene oil, and having a viscosity in the range from about 20 to about 200 SUS at 100° F.; about 1 to about 5 percent by weight of a foam stabilizer which is a fatty acid alkylolamide represented by the formula $$R'CONHR''OH$$

wherein R' is an aliphatic hydrocarbon radical containing from 8 to 22 carbon atoms, and R'' is an alkylene radical containing from 1 to 8 carbon atoms; and the remainder water.

References Cited by the Examiner
UNITED STATES PATENTS

| 2,334,709 | 11/1943 | Katzman et al. | 252—312 |
| 2,780,554 | 2/1957 | Lerner | 106—10 |
| 2,943,058 | 6/1960 | Cook | 252—153 |

OTHER REFERENCES

Armour, Etho-Chemicals, "Ethofats, Ethomids, Ethomeens," 1954, pages 18–21.

MORRIS LIEBMAN, *Primary Examiner.*